(12) United States Patent
McNamara

(10) Patent No.: US 9,561,837 B2
(45) Date of Patent: Feb. 7, 2017

(54) GEAR REDUCTION DRIVE

(71) Applicant: George Francis McNamara, Katonah, NY (US)

(72) Inventor: George Francis McNamara, Katonah, NY (US)

(*) Notice: Subject to any disclaimer, the term of this patent is extended or adjusted under 35 U.S.C. 154(b) by 0 days.

(21) Appl. No.: 14/845,239

(22) Filed: Sep. 3, 2015

(65) Prior Publication Data

US 2016/0075402 A1    Mar. 17, 2016

Related U.S. Application Data

(60) Provisional application No. 62/050,464, filed on Sep. 15, 2014.

(51) Int. Cl.
*F16H 1/36* (2006.01)
*B62M 11/02* (2006.01)
*B60B 27/00* (2006.01)

(52) U.S. Cl.
CPC ........... *B62M 11/02* (2013.01); *B60B 27/0026* (2013.01); *F16H 1/36* (2013.01)

(58) Field of Classification Search
CPC .................................. F16H 1/36; B62M 11/02
See application file for complete search history.

(56) References Cited

U.S. PATENT DOCUMENTS

2014/0080651 A1\*    3/2014    Kim ......................... F16H 1/28
475/149

\* cited by examiner

*Primary Examiner* — Derek D Knight

(57) ABSTRACT

The Gear Reduction Tricycle Wheel invention provides two methods of operation of a tricycle with the use of a simple locking pin. When the pin is inserted into the wheel, it operates as a standard wheel would. Without the pin in place, the wheel requires about four times less effort to move with a similar reduction in speed. This gives the option to move with superior control up, down, and over difficult terrain and within limited space (indoor, home, daycare). One can get the sensation of a good ride without the required distance. This new design in the wheel includes gears within the wheel where spokes usually are. In the absence of spokes, side disc plates support the tire rim and the gear axles.

2 Claims, 4 Drawing Sheets

GEAR REDUCTION DRIVE

RELATED APPLICATIONS

There are no current pending applications.

I. Field of the Invention

The present invention relates generally to a three-wheeled vehicle where a front wheel assembly has a selectable gear reduction assembly.

II. Background for the Invention

Many of us remember the tricycle as the first self-powered vehicle we ever rode. Its wide base makes for a very stable platform that is almost impossible to tip over. However, the direct drive wheel/pedal system makes it difficult for many children to pedal. It is especially a problem when on rough grade, or when trying to pedal uphill. Additionally, the large central tire has a tendency to slip on wet or smooth surfaces. Many children often require a push from a parent or care provider just to get going, which must be repeated each time the child stops moving. Some of these same issues are also apparent when using a wheelchair; another direct drive device. Accordingly, there exists a need for a means by which a direct driven wheel, such as on a tricycle, can be pedaled in an easier manner. The use of the present invention provides tricycle riders the ability to pedal their tricycles with reduced physical effort in a manner which is quick, easy, and effective.

III. DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION KEY

| | |
|---|---|
| 10 | gear reduction drive wheel |
| 20 | hub |
| 25 | sun gear |
| 30 | sun gear tooth |
| 35 | gear lock aperture |
| 40 | lock pin |
| 45 | first crank |
| 50 | second crank |
| 55 | carrier bearing journal |
| 60 | frame bearing journal |
| 65 | first pedal |
| 70 | second pedal |
| 90 | fork |
| 95 | cap |
| 100 | threaded fastener |
| 105 | frame bearing |
| 110 | carrier plate |
| 115 | first lock aperture |
| 120 | carrier plate inner bearing |
| 125 | carrier plate outer bearing |
| 130 | idler plate |
| 135 | second lock aperture |
| 140 | idler plate inner bearing |
| 145 | idler plate outer bearing |
| 150 | gear cavity |
| 155 | reverse planet gear |
| 160 | reverse gear tooth |
| 165 | reverse gear bearing |
| 170 | reverse gear shaft |
| 175 | flange |
| 180 | flange fastener |
| 185 | outer planet gear |
| 190 | outer planet gear tooth |
| 195 | outer planet gear bearing |
| 200 | outer planet gear shaft |
| 205 | ring gear |
| 210 | ring gear tooth |
| 215 | rim |
| 220 | tire |
| 240 | tricycle |
| 245 | tricycle frame |
| 250 | drive wheel |

IV. Description of the Invention

The best mode for carrying out the invention is preserved in terms of its preferred embodiment, herein depicted within FIGS. 1 through 4. However, the invention is not limited to the described embodiments and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

1. Detailed Description of the Figures

The present invention describes a gear reduction drive wheel (herein referred to as the "system") 10, which provides a means to include a gear reduction in the drive wheel 250 of a mode of transportation so as to be able to selectively increase the torque output capability of that mode of transportation. While this invention was originally conceived to function relative to a tricycle 240, it is understood that such a system 10, with the stated capabilities, can find broader applications without limiting the scope of this invention.

Figure 1:
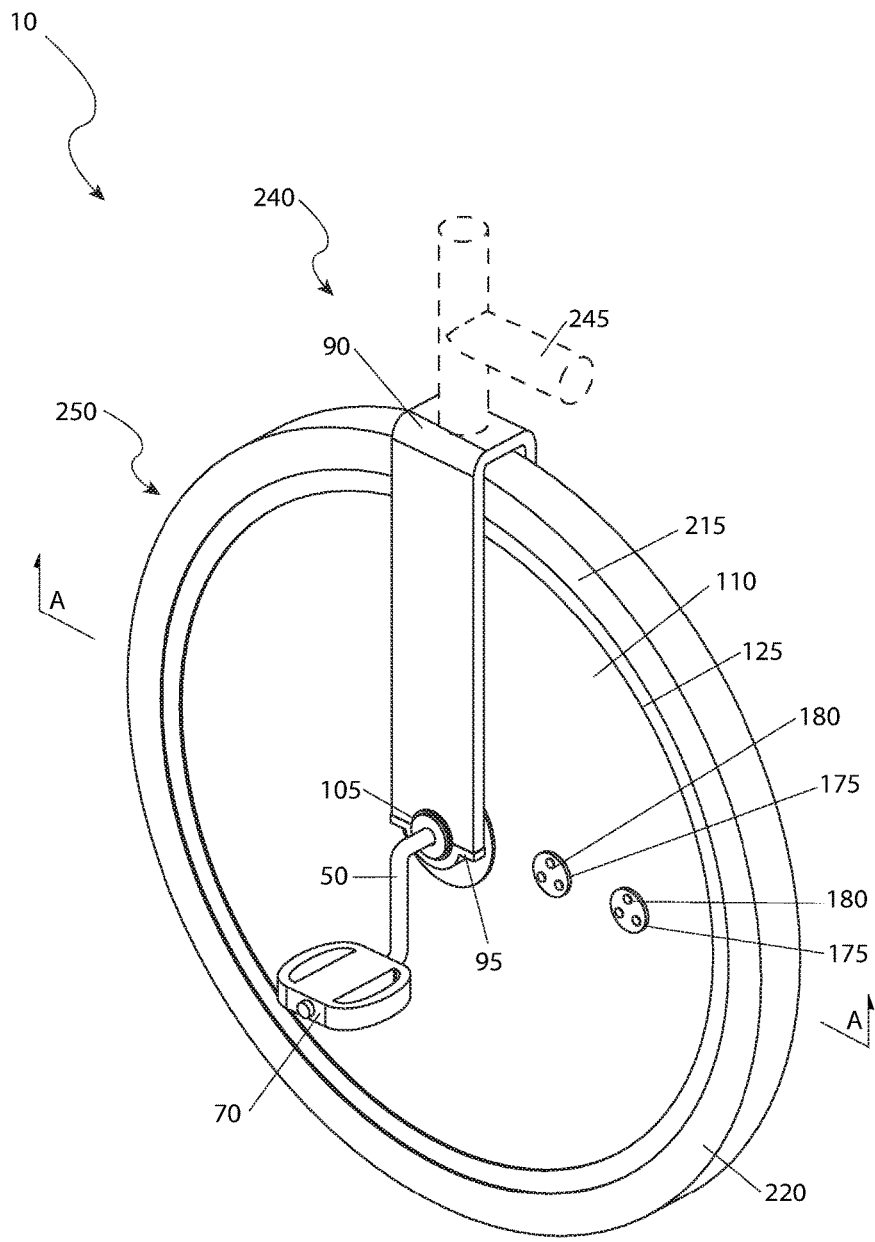
FIG. 1 is an isometric view of a gear reduction drive wheel 10 in accordance with the preferred embodiment of the present invention.
Figure 2:
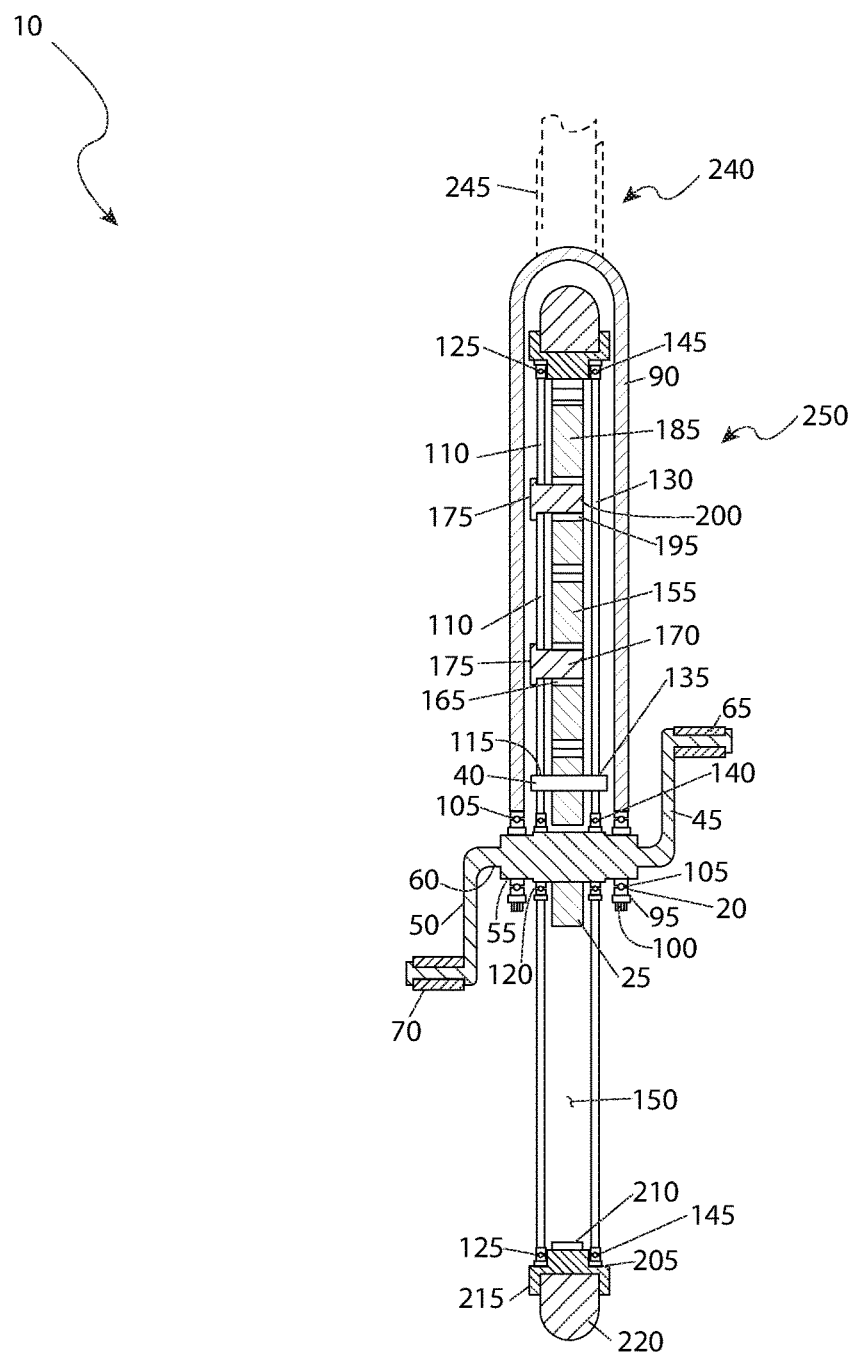
FIG. 2 is a section view along line A-A as shown on FIG. 1 of the gear reduction drive wheel 10 in accordance with the preferred embodiment of the present invention.

Referring now to FIG. 1, an isometric view, and FIG. 2, a section view along line A-A as shown in FIG. 1, of the system 10, according to the preferred embodiment of the present invention, are disclosed. The system 10 includes a sun gear 25 attached to a hub 20, two (2) planet gears 155, 185 rotationally supported on gear shafts 170, 200, and a ring gear 205 to which a rim 215 for a tire 220 is attached. The sun gear 25 is preferably configured to be a spur gear having an involute profile on a plurality of sun gear teeth 30. The sun gear 25 may be attached to the cylindrical hub 20 in a variety of ways such as, but not limited to, splines, any of a variety of keys, or by other use of specific geometry. The hub 20 is provided with carrier bearing journals 55 and frame bearing journals 60 on each end. The carrier bearing journals 55 are portions of the hub 20 in proximity to either side of the sun gear 25 preferably having a consistent diameter. The carrier bearing journals 55 provide a landing onto which the inner races of an idler plate inner bearing 140, on a first side, and a carrier plate inner bearing 120, on a second side, are seated and secured by means of a press fit. The idler plate inner bearing 140 and the carrier plate inner bearing 120 are preferably commercially available ball bearings having some type of seal to exclude contaminants. It is understood that other types of bearings, such as needle or roller bearings, may be utilized without limiting the scope of the system 10. Additional provisions, such as snap rings, fitted into snap ring grooves, may be included for the retention of the inner bearings 120, 145 without limiting the scope of the system 10. The frame bearing journals 60 are configured to be outboard of the carrier bearing journals 55. The frame bearing journals 60 are preferably slightly smaller in diameter than the carrier bearing journals 55 so as to minimize the distance through which the inner bearings 120, 145 must be pressed onto the hub 20. Additional provisions, such as a hearing nut with a locking ring may be included for the retention of the frame bearings 110 on the hub 20.

Attached to, or formed with, the hub 20 are a first crank 45 located on a first end, and a second crank 50 located on a second end. The first crank 45 and the second crank 50 are configured to be oppositely oriented, radially projecting moment arms for the application of coupling about the axis of the hub 20 in order to introduce a rotary motion into the system 10. A first pedal 65 is attached at a distal end of the first crank 45, while a second pedal 70 is attached at a distal end of the second crank 50 so as to enable a user to exert the moment applied to the hub 20 utilizing their feet.

The hub 20 is attached to a fork 90 which is in turn incorporated into the tricycle frame 245. The fork 90 is configured to be a piece having any appropriate cross-sectional shape with two (2) vertical support tubes joined at an upper horizontal member. The fork 90 is provided with bearing seats capable of accommodating the outer races of the frame bearing 105 and partially encircling that frame bearing 105. Each vertical support of the fork 90 is provided with a cap 95 at a lower end configured to be attached to the fork 90 by means of at least one (1) threaded fastener 100 and capable of retaining the frame bearing 105 within a bearing seat.

An idler plate 130 is mourned on the idler plate inner bearing 140. The idler plate 130 is preferably a circular metal plate which forms an outer cover for a gear cavity 150 on a first side and combines with the carrier plate 110 to support the tricycle frame 245 on the rim 215 and tire 220. An idler plate outer bearing 145 is mounted on an outer diameter of the idler plate 130 and supports the rim 215 on a first side. A carrier plate 110 is mounted on the carrier plate inner bearing 120. The carrier plate 110 is preferably a circular metal plate having provisions to accommodate the serviceable attachment of a reverse planet gear 155 and an outer planet gear 185 as well as forming an outer cover for the gear cavity 150 on a second side. A carrier plate outer bearing 125 is mounted on an outer diameter of the carrier plate 110 and supports the rim 215 on a second side. The idler plate outer bearing 145 and the carrier plate outer bearing 125 are preferably commercially available ball bearings having some type of seal to exclude contaminants.

The reverse planet gear 155 is preferably a spur gear having an involute profile on a plurality of reverse planet gear teeth 160. The reverse planet gear teeth 160 are meshed with the sun gear teeth 30 so that as the sun gear 25 rotates, the reverse planet gear 155 rotates in an opposite direction. In a preferred embodiment, the number of reverse gear teeth 160 on the reverse planet gear 155 is equal to the number of sun gear teeth 30 on the sun gear 25 and therefore the rotational speed of both gears 25, 155 is equal. It can be seen that the drive ratio of sun gear 25 to reverse planet gear 155 is equal to the ratio of the sun gear teeth 30 to the reverse gear teeth 160 and that in alternate embodiments this may be advantageously exploited. The reverse planet year 155 is mounted on a preferably cylindrical reverse gear shaft 170. The reverse gear shaft 170 is provided with a preferably circular flange at a first end which is connected to the carrier plate 110 by means of a plurality of threaded flange fasteners 180 secured into complimentary threaded apertures (not shown) in the carrier plate 110. A reverse gear bearing 165 is fitted into a central aperture (reverse gear bore) of the reverse planet gear 155 and allows a free rotation of the reverse planet gear 155 relative to the reverse gear shaft 170. The reverse gear bearing 165 may be any type of bearing, such as needle, roller, or sleeve, appropriate to serve the intended function without limiting the scope of the system 10. Additional provisions, such as a snap ring, fitted into a snap ring groove, may be included for the retention of the reverse planet gear 155 and the reverse rear bearing 165 on the reverse gear shaft 170.

An outer planet gear 185 is mounted onto an outer planet gear shaft 200 in a similar manner to the reverse planet gear 155. The outer planet gear teeth 190 are meshed with the reverse gear teeth 160 such that as the reverse planet gear 155 rotates, the outer planet gear 185 rotates in an opposite direction. This counter revolution between the sun gear 25, the reverse planet gear 155, and the outer planet gear 185 results in the rotation of the outer planet gear 185 in the same direction as the sun gear 25. An outer planet gear bearing 195 is fitted into a central aperture (outer planet gear bore) of the outer planet gear 185 to permit the free rotation of the outer planet gear 185 relative to the outer planet gear shaft 200. In an alternate embodiment, the outer planet gear 185 may be fixed to the outer planet gear shaft 200 with provisions for allowing the outer planet gear shaft 200 to freely rotate relative to the carrier plate 110.

The ring gear 205 is preferably an internal gear having an involute profile on a plurality of ring gear teeth 210. The ring gear 205 is affixed to the rim 215 and encircles the other gears 25, 155, 185 with the outer planet gear teeth 190 meshing with the ring gear teeth 210. Since the ring gear 205 is an internal gear, i.e. the involute ring gear teeth 210 facing radially inward, the direction of revolution corresponds to the outer planet gear 185 and the sun gear 25. Because the diameter of the ring gear 205 is much larger in comparison to the outer diameter of the outer planet gear 185 the rotational speed of the ring gear 205 will be proportionally reduced by the ratio of the number of outer planet gear teeth 190 to the number of ring gear teeth 210 ($\omega = n_{t185}/n_{t210}$). This will result in a multiplication of the transmitted torque to the ring gear 210 approximately equal to the inverse of the tooth ratio ($\tau = n_{t210}/n_{t185}$). The tire 220 is mounted onto the rim 215 and rotates in concert with the rim 215. The tire 220 is configured to he a torus of a rubber material, or other similar polymer material.

Figure 3:
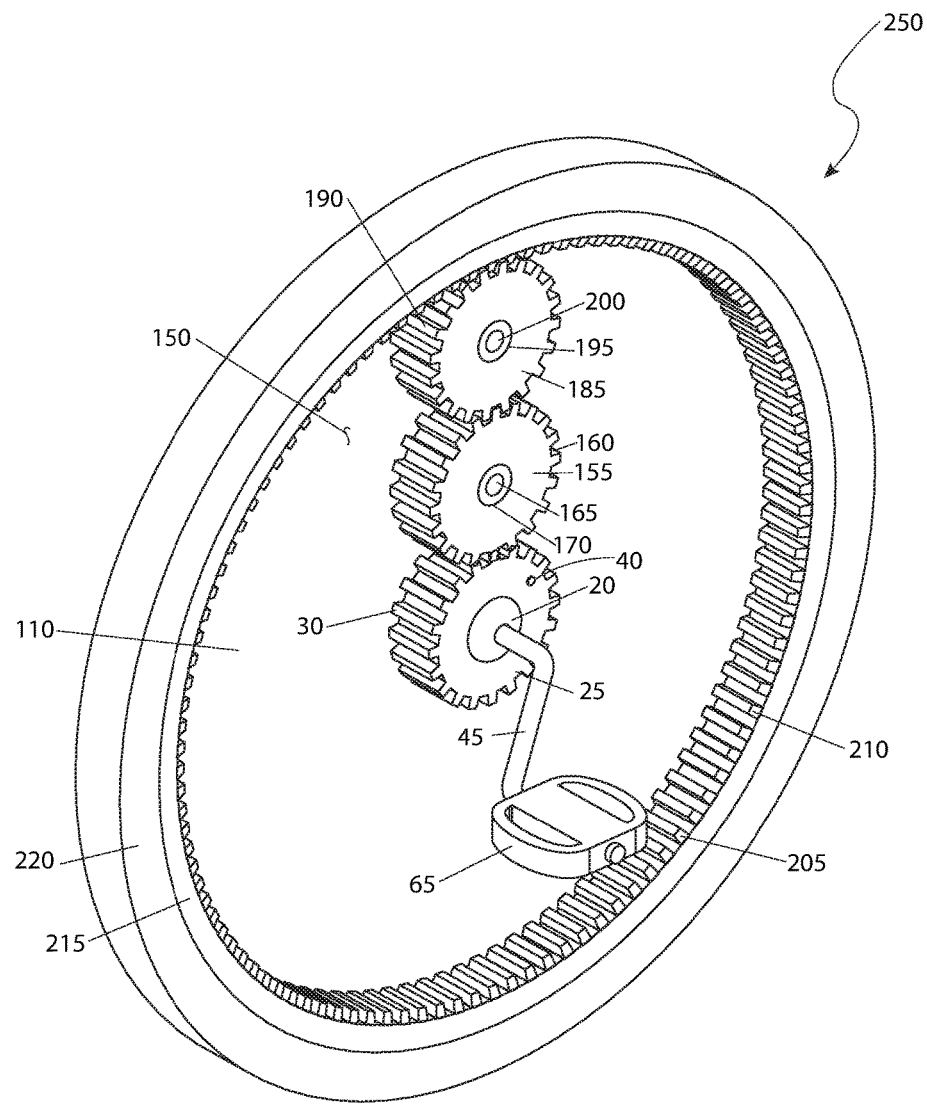
FIG. 3 is a schematic view of the gear reduction drive wheel 10 in a direct drive configuration in accordance with the preferred embodiment of the present invention; and, FIG. 4 is a schematic view of the gear reduction drive wheel 10 engaged in a gear reduction mode in accordance with the preferred embodiment of the present invention.
Figure 4:
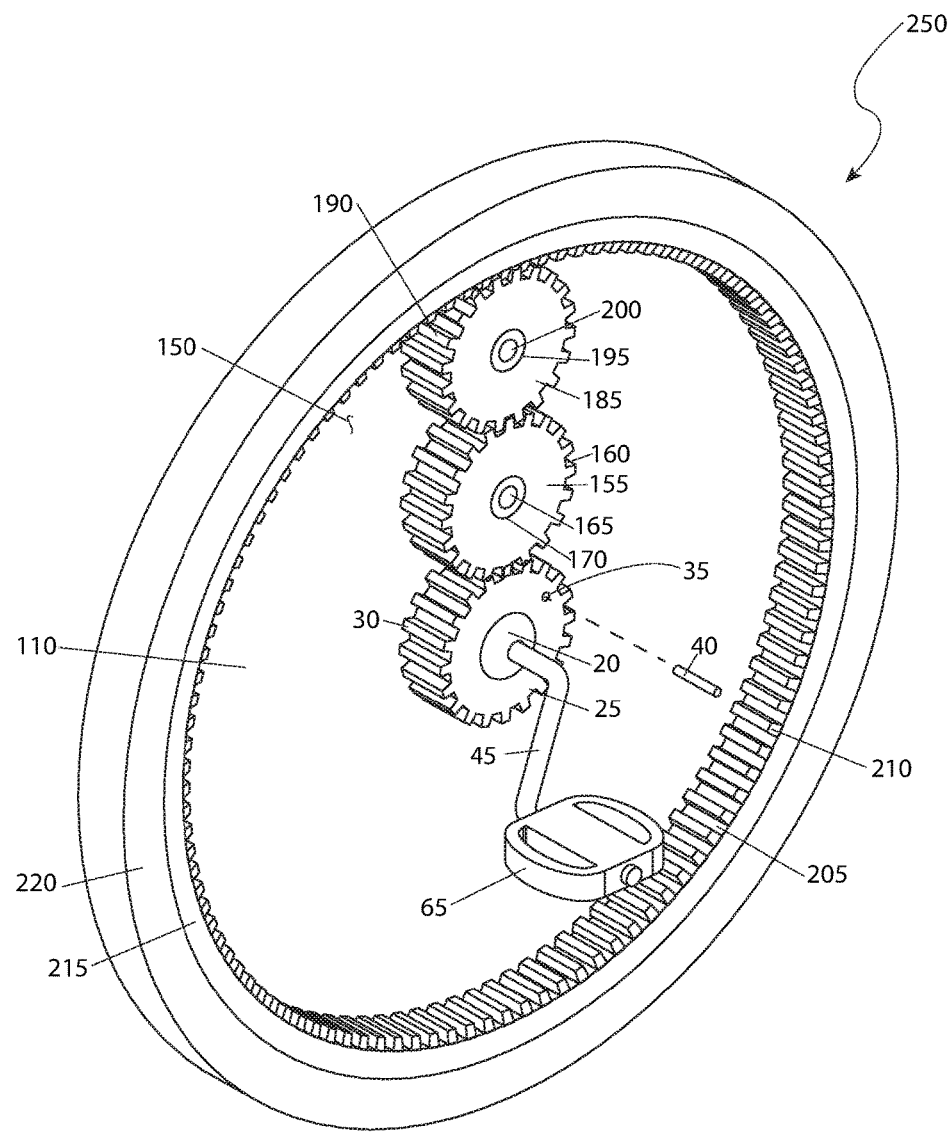

Referring now to FIG. 3 a schematic view of the system 10 in a direct drive configuration, and FIG. 4, a schematic view of the system 10 engaged in a gear reduction mode, according to the preferred embodiment of the present indention, are disclosed. Disposed in the carrier plate 110 is a first lock aperture 115 configured to be a circular aperture for the sliding insertion of a cylindrical lock pin 40. The sun gear 25 is provided with a similar gear lock aperture 35. Disposed in the idler plate 130 is a corresponding second lock aperture 135. When the gear lock aperture 35 in the sun gear 25 is in alignment with the first lock aperture 115 and the second lock aperture 135, the lock pin 40 may be slidingly inserted, as depicted in FIG. 3, to result in the system 10 rotating as a single unit without any relative internal motion between any of the components in accord with any force applied to the first crank 45 via the first pedal 65 or to the second crank 50 via the second pedal 70. When the lock pin 40 is not inserted through the apertures 35, 115, 135, as illustrated in FIG. 4, the sun gear 25 is permitted to rotate relative to the reverse planet gear 155, thus driving the outer planet gear 185 and the ring gear 205 in turn.

It is envisioned that in an alternate embodiment the system 10 may be adapted to be utilized on the drive wheels of a wheelchair in order to permit a similar gear ratio change to facilitate mobility under certain conditions.

2. Operation of the Preferred Embodiment

In accordance with the invention, the illustrated embodiment can be utilized by an enabled individual in a simple and straightforward manner with little or no training. After initial purchase or acquisition of the system 10, it would be installed as indicated in FIG. 1. The method of installing and utilizing the system 10 may be achieved by performing the following steps: acquiring a model of the system 10 having a desired style to suit the taste of a user; positioning oneself upon a seat in the normal fashion; pedaling the tricycle 240 by means of the first pedal 65 and the second pedal 70 and utilizing the handlebars to steer the tricycle 240 in the desired path of travel. When the effort to pedal the tricycle 240 has increased due to an uphill grade or an increased rolling resistance of the tire 220 the user may remove the lock pin 40 from the drive wheel 250 to experience a decreased rotational speed of the drive wheel 250 with a corresponding decrease in the effort to pedal the tricycle 240.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A gear reduction drive wheel, comprising: a sun gear attached to a hub; a first planet gear rotationally supported on a first gear shaft and in mechanical communication with said sun gear; a second planet gear rotationally supported on a second gear shaft and in mechanical communication with said first planet gear; and, a ring gear configured to be attached to a rim of a tire of a vehicle and in mechanical communication with said second planet gear; wherein said sun gear, said first planet gear, said second planet gear, and said ring gear are disposed within a gear cavity; wherein said hub is configured to be affixed to a fork of said vehicle; wherein said hub drives said sun gear, said first planet gear, said second planet gear, said ring gear, said rim, and said tire to propel said vehicle, wherein said hub further comprises: carrier bearing journals providing a landing onto which inner races of an idler plate inner bearing and a carrier plate inner bearing are seated; an idler plated mounted to said idler plate bearing; a carrier plate mounted to said carrier plate bearing; frame bearing journals configured to be outboard of said carrier bearing journals; a first crank located on a first end of said hub; a first pedal mechanically connected to said first crank; a second crank located on a second end; a second pedal mechanically connected to said second crank; wherein said idler plate and said carrier plate form outer covers for said gear cavity and support said rim of said tire; wherein said first planes gear is in mechanical communication with said carrier plate.

2. The gear reduction drive wheel of claim 1, further comprising:
   a first lock aperture disposed within said carrier plate;
   a second lock aperture disposed within said idler plate;
   a sun get lock aperture disposed within said sun gear;
   wherein said first lock aperture, said second lock aperture, and sun gear lock aperture, when aligned, are configured to receive a lock pin.

\* \* \* \* \*